(12) United States Patent
Gunderson

(10) Patent No.: US 6,781,753 B2
(45) Date of Patent: Aug. 24, 2004

(54) Z-AXIS FRAME FOR A HIGH ACCURACY ORTHOGONAL MOTION STAGE

(75) Inventor: Gary M. Gunderson, Issaquah, WA (US)

(73) Assignee: Applied Precision, LLC, Issaquah, WA (US)

( * ) Notice: Subject to any disclaimer, the term of this patent is extended or adjusted under 35 U.S.C. 154(b) by 0 days.

(21) Appl. No.: 10/037,439

(22) Filed: Dec. 31, 2001

(65) Prior Publication Data

US 2002/0093733 A1 Jul. 18, 2002

Related U.S. Application Data

(60) Provisional application No. 60/259,150, filed on Dec. 29, 2000.

(51) Int. Cl.[7] ............................................... G02B 21/26
(52) U.S. Cl. ....................... 359/393; 359/391; 359/392; 359/396; 359/397
(58) Field of Search ................................. 359/393, 391, 359/392, 396, 397, 368, 372, 369, 382

(56) References Cited

U.S. PATENT DOCUMENTS

| | | | | |
|---|---|---|---|---|
| 3,652,146 A | * | 3/1972 | George ........................ 359/392 |
| 4,072,428 A | * | 2/1978 | Moss .......................... 356/244 |
| 5,481,527 A | * | 1/1996 | Kasanuki et al. ........... 369/126 |
| 5,812,310 A | | 9/1998 | Stewart et al. .............. 359/392 |
| 6,400,516 B1 | * | 6/2002 | Spinali ....................... 359/819 |
| 6,517,060 B1 | * | 2/2003 | Kemeny ..................... 267/136 |

* cited by examiner

*Primary Examiner*—Drew A. Dunn
*Assistant Examiner*—Joshua L Pritchett
(74) *Attorney, Agent, or Firm*—Pillsbury Winthrop LLP

(57) ABSTRACT

A Z-axis stage for use in, e.g., an orthogonal motion microscope stage, includes a carrier plate, an actuator plate, and a base. Three or more upper camming elements with downwardly directed camming surfaces are mounted to the underside of the carrier plate using a semi-kinematic mounting technique. Three or more lower camming elements with upwardly directed camming surfaces are mounted to the top surface of the base using a semi-kinematic mounting technique. The actuator plate includes apertures to accommodate the lower camming elements and the upper and lower camming surfaces of adjacent camming elements are mated. Linear slides are interposed between the mated camming surfaces and the lower camming elements and the base. Movement of the actuator plate in an X-Y reference plane translates into movement of the carrier plate along the Z-axis (i.e., the optical axis) in response to the relative, sliding motion of the mated camming elements.

6 Claims, 4 Drawing Sheets

Z-AXIS FRAME FOR A HIGH ACCURACY ORTHOGONAL MOTION STAGE

This application claims the benefit of Provisional application Ser. No. 60/259,150 filed Dec. 29, 2000.

BACKGROUND

Confocal microscopes may employ small aperture objective lenses to improve depth of field at high magnifications. As a result, such confocal microscopes require high intensity light sources to provide sufficient specimen illumination for viewing or electronic imaging. Inorganic and some organic specimens can generally tolerate exposure to such high intensity light sources. However, many organic and most active biological samples cannot tolerate prolonged exposure to high intensity light sources. For this reason, modern researchers, particularly in the biotechnology field, have welcomed the introduction of wide field, optical sectioning microscopes employing wide aperture lenses. Due to the greater light gathering ability of these optics, active biological samples can be viewed for prolonged periods.

Some systems collect optical information from wide field optics electronically, such as in a charged coupled device array, to digitize and integrate that information over time, and to provide a computer generated three dimensional image of the sample. Such measurement techniques are particularly valuable in the field of florescence microscopy where images of the specimen are not only integrated over time, but wavelength as well.

Due to the unique nature of wide field microscopy, precise movement of the specimen along the optical axis, as well as in a plane perpendicular to the optical axis (hereinafter "reference plane") is critical for the development of an accurate three dimensional image of the sample. The ability to move the sample in the reference plane, without inducing undesired motion along the optical axis is important for maintaining the sample in focus, as well as for the development of an accurate three dimensional representation.

Historically, confocal microscopes have not been burdened with the challenges of developing a three dimensional image of the specimen. Thus, movement of the specimen in the X and Y direction (i.e., the reference plane) does not present a problem even if undesirable and motion in the Z-axis (i.e., the optical axis) is induced. The microscope operator merely refocuses the image. Thus, microscope stages employing confocal technology typically employ independent frames or carriers which are moveable in the X-, Y- and Z-axis directions by manually operated, micrometer type devices. Such devices are not suitable for adaptation to computer control where a pre-established scanning pattern is imposed on the specimen to develop the desired three dimensional image.

Accordingly, it would be desirable to provide an orthogonal motion microscope stage which is capable of moving a specimen in the X-Y reference plane and Z-axis optical direction with high accuracy. The motion of the stage carriers or frames is preferably automatic and adapted for computer control.

SUMMARY

A Z-axis stage for use in, e.g., an orthogonal motion microscope stage, includes a carrier plate, an actuator plate, and a base. Three or more upper camming elements with downwardly directed camming surfaces are mounted to the underside of the carrier plate using a semi-kinematic mounting technique. Three or more lower camming elements with upwardly directed camming surfaces are mounted to the top surface of the base using a semi-kinematic mounting technique. The semi-kinematic mounts include a hemispherical mount attached to the mounting surface and a cone receptacle in the component to be mounted. The actuator plate includes apertures to accommodate the lower camming elements and the upper and lower camming surfaces of adjacent camming elements are mated. Linear slides are interposed between the mated camming surfaces and the lower camming elements and the base. A linear actuator is used to move the actuator plate in an X-Y reference plane, and this motion is translated into movement of the carrier plate along the Z-axis (i.e., the optical axis) in response to the relative, sliding motion of the mated camming elements.

DETAILED DESCRIPTION

Figure 1:
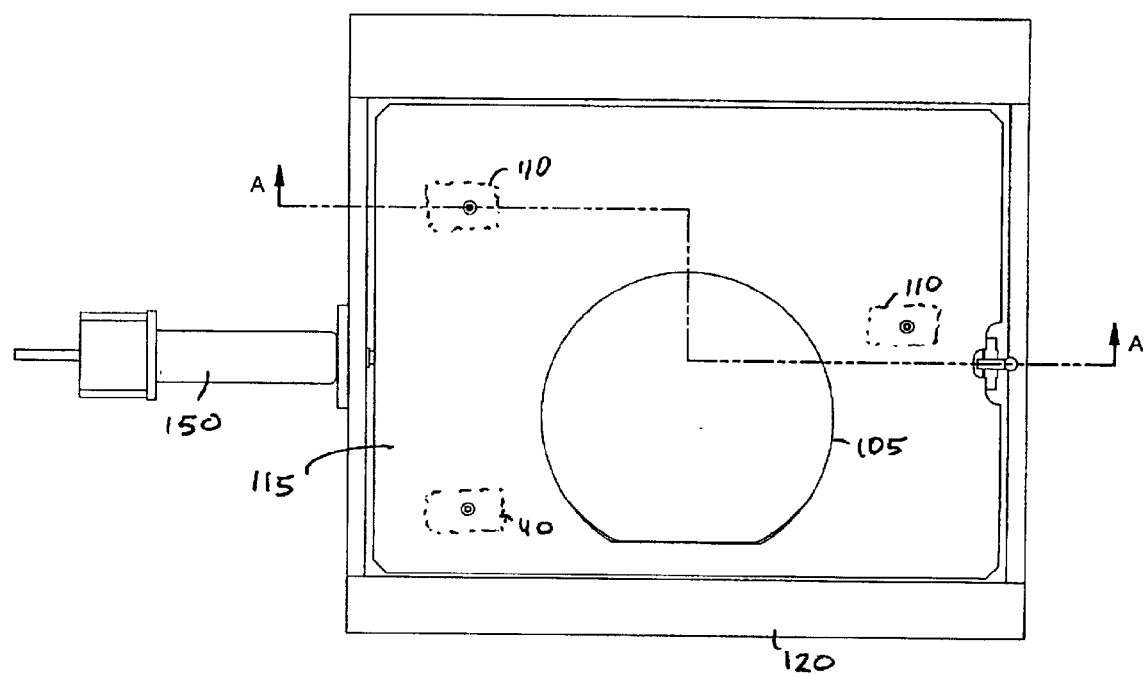
FIG. 1 is a plan view of a Z-axis stage according to an embodiment.

FIG. 1 illustrates a linear Z-axis stage 100 according to an embodiment. The Z-axis stage may be used in an orthogonal motion stage, which includes independent X-, Y-, and Z-axis stages. Such orthogonal stages may be used in optical microscopes, such as wide field, optical sectioning microscopes used under computer control to generate three dimensional images of a specimen. The Z-axis stage may be used to precisely control a linear Z-axis (i.e., the optical axis) motion of an optical element. The X-, Y-, and Z-axis stages and a base of the orthogonal motion stage may include centrally located apertures 105 to provide an optical pathway for the optical element.

Figure 2:
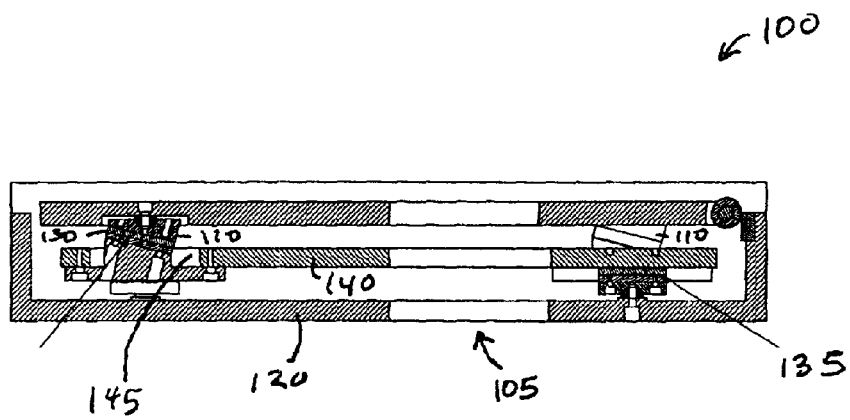
FIG. 2 is a cross-sectional view of the Z-axis stage of FIG. 1 taken along line A—A.

As shown in FIG. 2, downwardly depending camming elements 110 may be mounted on the underside of a carrier plate 115. These "upper" camming elements 110 have camming surfaces which form an angle, e.g., approximately 18.5 degrees, with respect to the plane defined by the X- and Y-axes. A base 120 may include cooperating upwardly depending camming elements 125 with "upward" camming surfaces having complementary angles with respect to the "downward" camming surfaces of the upper camming elements 110. Both the upward camming surfaces and downward camming surfaces may be adapted to receive linear slides 130. A linear slide may be secured to each adjacent pair of upward and downward camming surfaces. Linear slides 135 may also be provided between the "lower" camming elements 125 and the base 120.

An actuator plate 140 may be interposed between the carrier plate 115 and the base 120. The actuator plate 140 includes oblong apertures to accommodate the mated upper and lower camming elements. A linear actuator 150 may be provided to move the actuator plate in the X-axis direction. As the actuator plate moves, it causes the camming surfaces to slide in relation to each other. This action will either raise or lower the carrier plate in relation to the base. Thus, movement of the actuator plate 140 in the X-axis direction will translate to movement of the carrier plate 115 in the Z-axis direction, e.g., at a ratio of about 3:1 with camming angles of 18.5 degrees.

Figure 3:
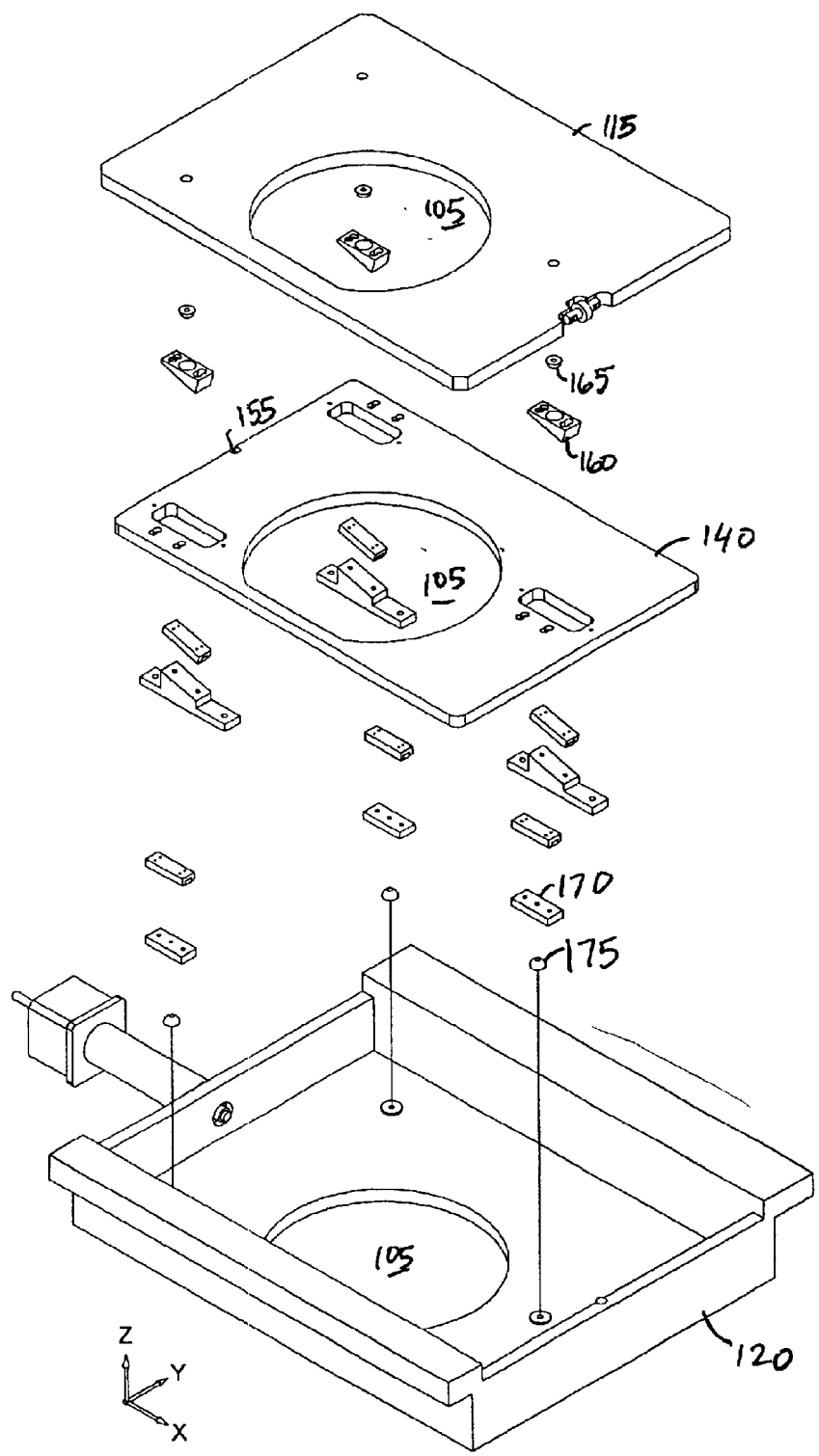
FIG. 3 is an exploded perspective view of the Z-axis stage of FIG. 1.

The linear actuator 150 may include on-board circuitry to enable precise, computer control of the actuator plate 115 by way of, for example, a computer software interface. The linear actuator 150 may include a piston portion which reacts against a notch 155 in the actuator plate 140, as shown in FIG. 3. One or more reaction tension springs may be connected between the base 120 and the actuator plate so that the actuator plate can follow the motion of the piston.

For precise translation of the X-axis motion of the actuator plate 140 to the Z-axis motion of the carrier plate 115, the linear slides 130 and 135 must be precisely aligned. The linear slides may be relatively small and delicate components. Even slight misalignments between the linear slides may cause the structure to become overconstrained, which may twist or deform the linear slides, thereby damaging the stage and impacting performance.

Several factors may cause the linear slides 130, 135 to be misaligned. These factors may be specific to the structure of an individual stage, for example, the degree of flatness of the carrier plate and base surfaces on which the camming elements are mounted. To ensure proper alignment of the linear slides, an assembled stage may need to be tested, then disassembled and the components adjusted and/or modified, and the stage reassembled to achieve a perfectly constrained structure for that particular stage. Such modifications may be costly in terms of production time, labor, and component costs.

As shown in FIGS. 2 and 3, a semi-kinetic mounting technique may be used to mount the upper camming elements and lower camming elements to the carrier plate 115 and base 120, respectively. The semi-kinetic mounts may reduce or eliminate overconstraint in the Z-axis stage 100.

Figure 4:
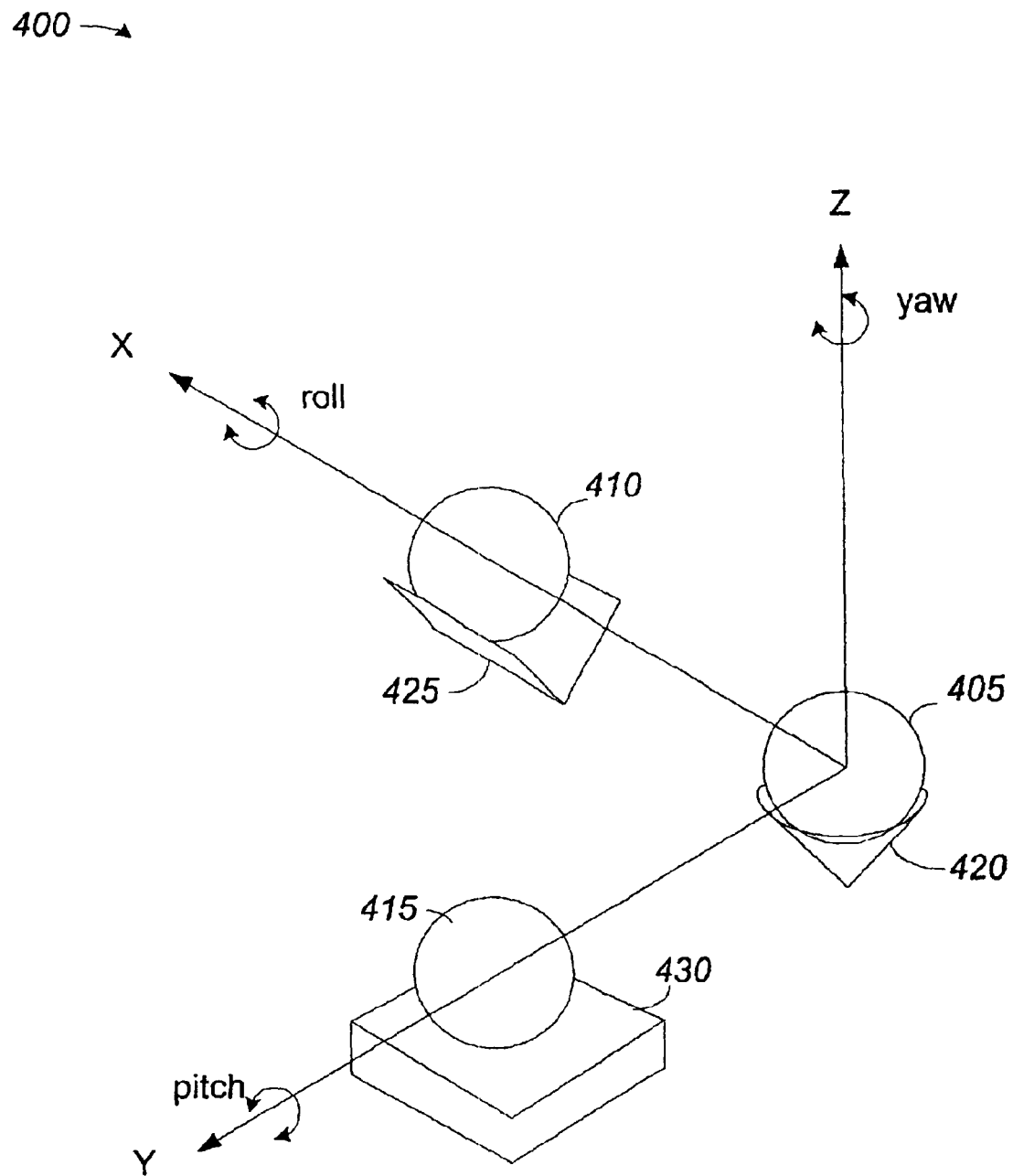
FIG. 4 is a perspective view of a kinematic mount.

A mount is said to be kinematic when six physical constraints are provided to constrain six degrees of freedom, e.g., X-, Y-, and Z-axis motion as well as pitch, roll, and yaw. Thus, any physical constraints applied are non-redundant. A common type of kinematic mount 400 is the "cone, groove, and flat" mount shown in FIG. 4. Consider an optic element as being attached to the coordinate system of three spheres 405, 410, 415, and the optic's corresponding mount including a cone 420, a groove 425, and a flat 430. If the sphere 405 is first seated in the cone 420, three degrees of freedom (X, Y, and Z translations) are eliminated without redundancy. At this point, the optic can still rotate freely about all axes. Next, the second sphere is seated in the groove 425 which is aligned towards the cone 420. This constrains or eliminates two more degrees of freedom, pitch and yaw. The alignment of the groove towards the cone is important in order not to overconstrain one or more of the translation degrees of freedom. Finally, there is only one degree of freedom left to constrain, roll about the X-axis. This is accomplished by seating the third sphere 415 on the flat 430. The six non-redundant constraints makes this a kinematic mount.

As shown in FIG. 3, three ball-in-cone mounts are provided on each mounting surface (i.e., the carrier plate 115 and the base 120) to produce a semi-kinematic mount which retains some degree of freedom. The upper camming elements may include cone receptacles 160. These cone receptacles mate with hemispherical mounts 165 connected to the carrier plate 115. The lower camming elements 125 may be attached to linear slides 135. These lower camming element/linear slide assemblies may be attached to horizontal kinematic mounting elements 170 which include cone recesses that mate with hemispherical mounts 175 attached to the base 120. The lower camming elements are coupled to the linear slides 135 and upper camming elements 110 through the oblong apertures 145 in the actuator plate 140.

The three mounting surfaces on the base 120 to which the hemispherical mounts 125 are attached do not need to be flat or coplanar because the hemispherical surfaces of the mounts 175 determine the mounting plane. This also applies to the mounts 165 on the underside of the carrier plate 115. When assembled, the ball-in-cone design allows non-constrained connections. Free in the pitch and roll degrees of freedom, the mating linear slides are allowed to self-align.

Since the semi-kinematic mounts still have some degree of freedom, the through holes in the downward camming element and the horizontal mounting element may be provided with a generous tolerance to enable these mounting elements to move in the X- and Y-directions during assembly. This may enable the assembler to better center the stage to the base 120.

Figure 5:
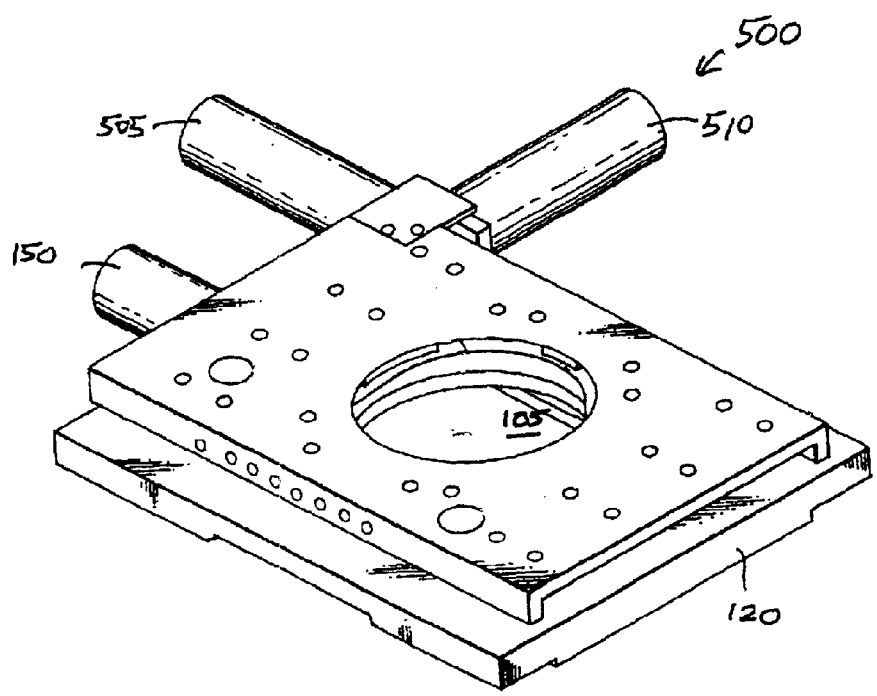
FIG. 5 is a perspective view of an orthogonal motion microscope stage including a Z-axis stage according to an embodiment.

The Z-axis stage 100 may be incorporated into an orthogonal motion microscope stage 500, as shown in FIG. 5. The stage 500 includes X-axis and Y-axis frames which are movable in their respective directions using linear actuators 505 and 510, respectively.

A number of embodiments have been described. Nevertheless, it will be understood that various modifications may be made without departing from the spirit and scope of the invention. Accordingly, other embodiments are within the scope of the following claims.

What is claimed is:

1. Apparatus comprising:
   a carrier plate including a plurality of spherical mounts attached to an underside of said carrier plate;
   a first plurality of camming elements, each of said first plurality of camming elements including a downwardly directed camming surface and a cone-shaped receptacle operative to receive a corresponding one of said spherical mounts;
   a second plurality of camming elements, each of said second plurality of camming elements including an upwardly directed camming surface slidably connected to a corresponding one of the downward directed camming surfaces; and
   an actuator plate coupled to the second plurality of camming elements such that the upwardly directed camming surfaces move in relation to the downward directed camming surfaces in response to the actuator plate moving along a first axis, and wherein movement of the actuator plate along the first axis translates into movement of the carrier plate along a second axis orthogonal to said first axis.

2. The apparatus of claim 1, further comprising an actuator operative to move the actuator plate along the first axis.

3. The apparatus of claim 1, further comprising:
   a base; and
   a second semi-kinematic mount connecting the second plurality of camming elements to a surface of the base.

4. The apparatus of claim 3, wherein the actuator plate includes a plurality of apertures adapted to accommodate the second plurality of camming elements.

5. The apparatus of claim 1, wherein each of said downward directed camming surfaces are inclined at an angle of approximately 18.5 degrees from a plane of said surface of the carrier plate.

6. The apparatus of claim 1, wherein each of the first plurality of camming elements is rigidly attached to the carrier plate following assembly of the apparatus.

* * * * *